No. 694,570. Patented Mar. 4, 1902.
T. M. NORTH.
VARIABLE CAM MECHANISM.
(Application filed Apr. 22, 1901.)

(No Model.) 4 Sheets—Sheet 1.

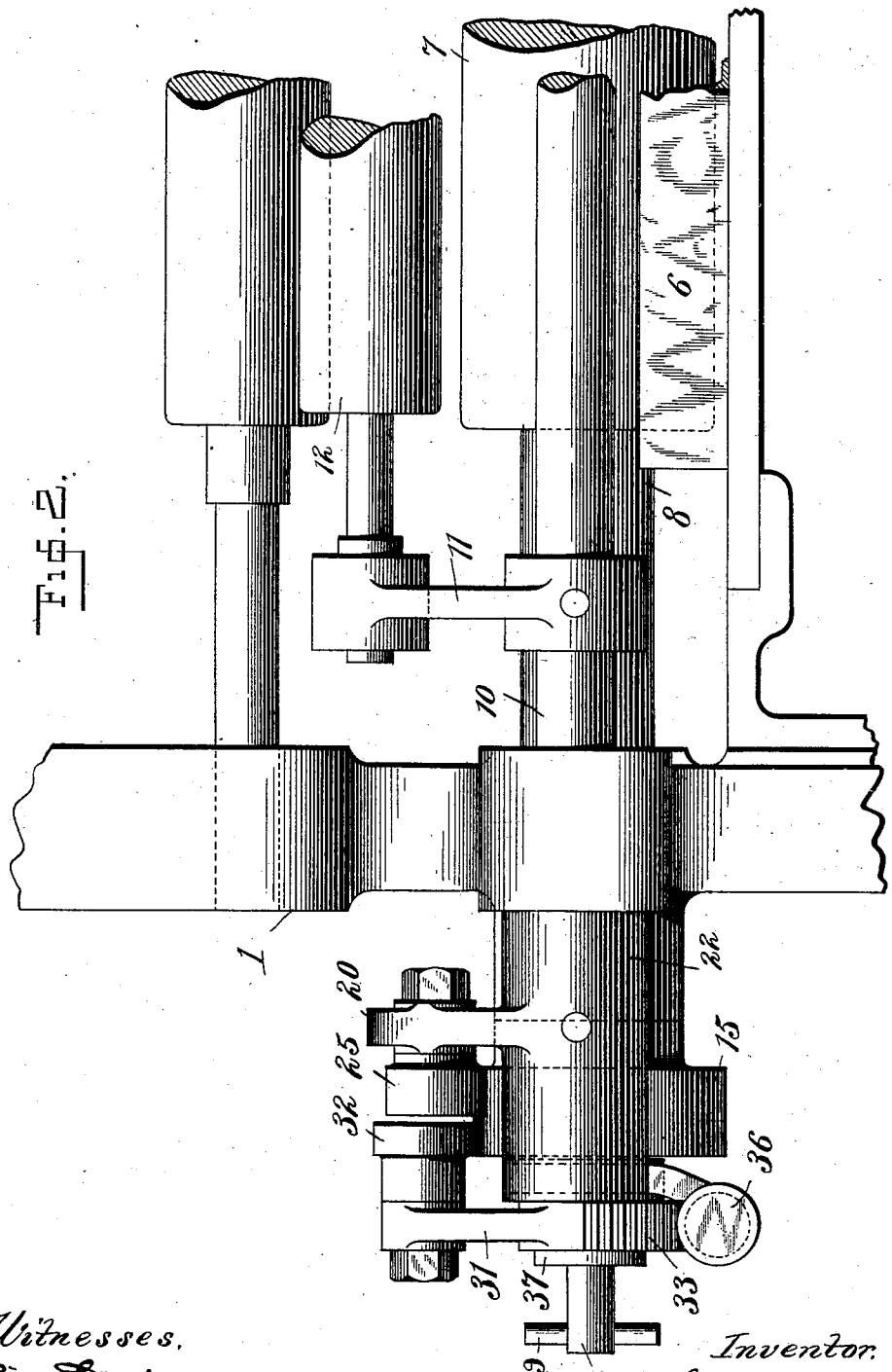

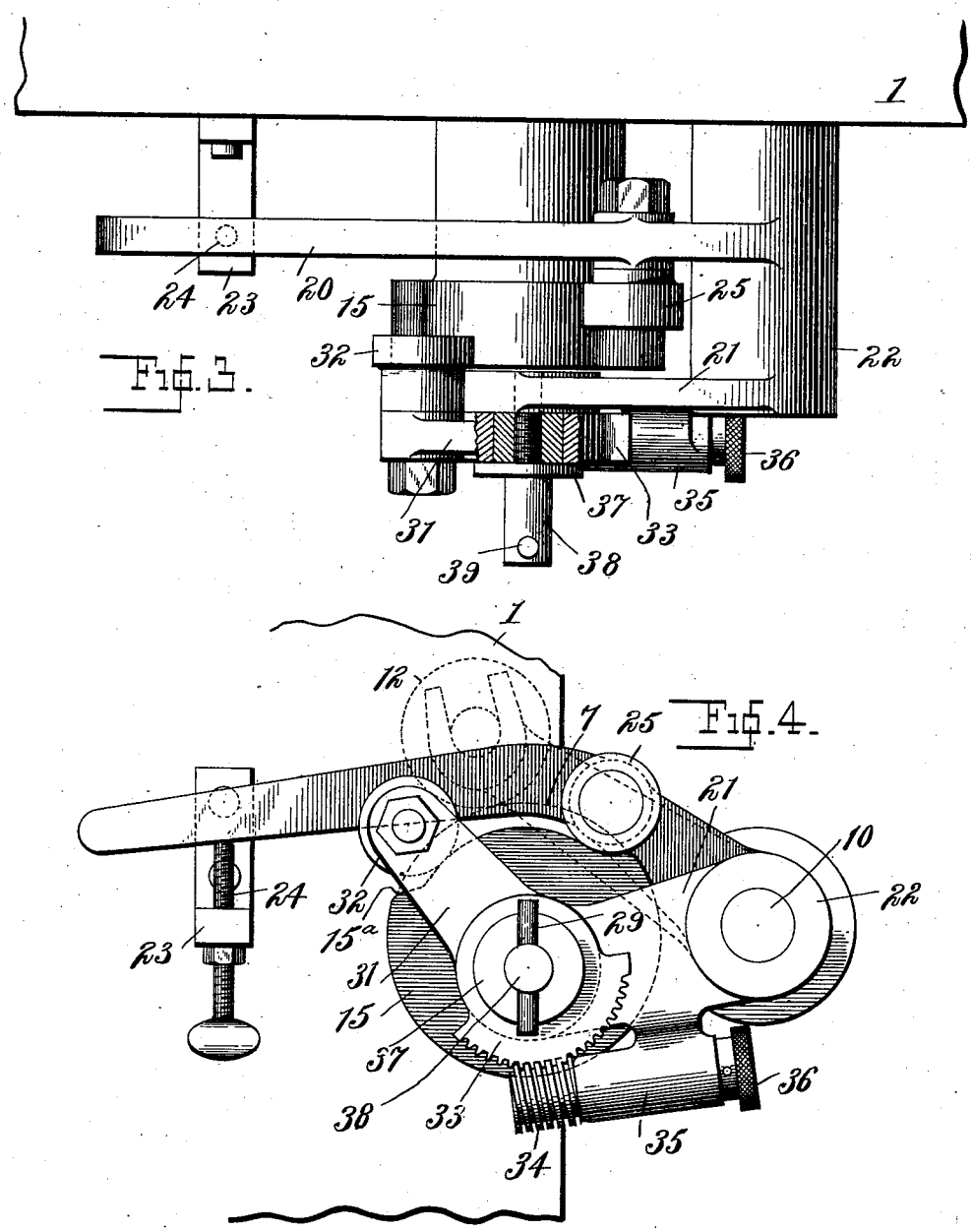

No. 694,570. Patented Mar. 4, 1902.
T. M. NORTH.
VARIABLE CAM MECHANISM.
(Application filed Apr. 22, 1901.)

(No Model.) 4 Sheets—Sheet 4.

UNITED STATES PATENT OFFICE.

THOMAS M. NORTH, OF PLAINFIELD, NEW JERSEY, ASSIGNOR, BY MESNE ASSIGNMENTS, TO ALUMINUM PRESS COMPANY, OF PLAINFIELD, NEW JERSEY, AND NEW YORK, N. Y., A CORPORATION OF NEW YORK.

VARIABLE CAM MECHANISM.

SPECIFICATION forming part of Letters Patent No. 694,570, dated March 4, 1902.

Application filed April 22, 1901. Serial No. 56,946. (No model.)

*To all whom it may concern:*

Be it known that I, THOMAS M. NORTH, a subject of the King of Great Britain and Ireland, residing at Plainfield, county of Union, and State of New Jersey, have invented certain new and useful Improvements in Variable Cam Mechanism, of which the following is a specification.

The object of my invention is to produce a variable cam mechanism of simple construction which can readily be adjusted while the mechanism is operating for changing the time and operation of the part actuated by the cam.

To this end my invention consists in the combination of a cam with a two-part rock-arm arranged in operative relation to the cam, each of the two parts of the rock-arm being provided with an antifriction-roller, which runs upon the periphery of the cam, and the two parts of the rock-arm being adjustable relatively to bring them closer together or further apart. The two-part rock-arm is held in normal position by the engagement of one or both of the antifriction-rollers with the high part of the cam and is moved into its other position only when the antifriction-rollers of both parts of the rock-arm enter the low part of the cam. Any suitable hand-operated adjusting device may be provided for changing the relative position of the two parts of the rock-arm.

My invention is particularly useful as part of the operating mechanism of the water-motion of a printing-press, and I have illustrated my invention in this connection; but I would have it understood that I do not limit myself to this application of the invention, but desire to cover the same in the broadest possible manner irrespective of the use to which it is applied.

In order that my invention may be fully understood, I will first describe the same with reference to the accompanying drawings and afterward point out the novelty with more particularity in the annexed claims.

Figure 1:
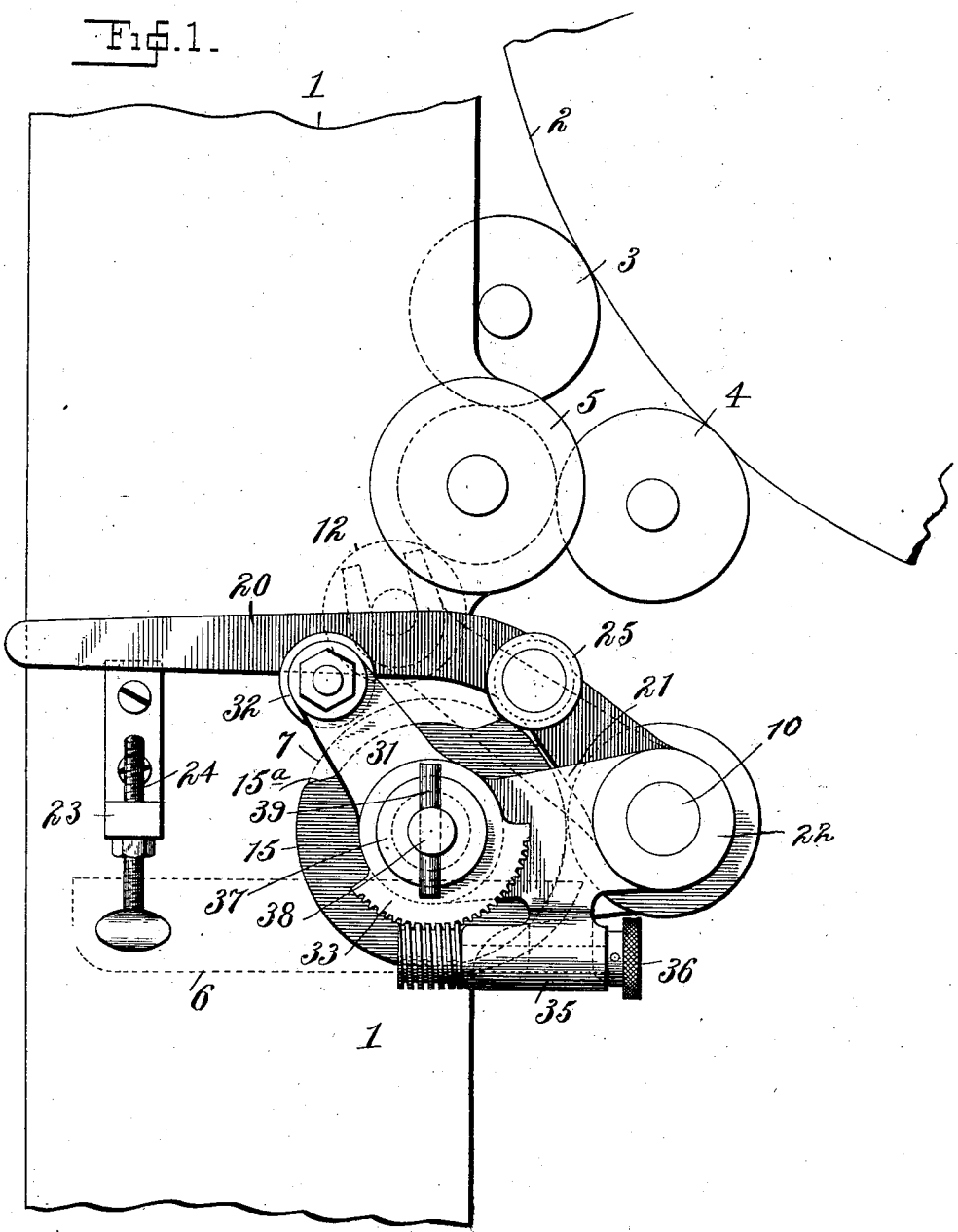

In said drawings, Figure 1 is a detail side elevation of part of the water-motion of a printing-press, showing my improved variable cam mechanism applied thereto. Fig. 2 is a detail front elevation of the same. Fig. 3 is a detail plan view. Fig. 4 is a detail view similar to Fig. 1 of the essential parts of my improved mechanism and showing the parts in a different position from that represented in Fig. 1. Figs. 5, 6, 7, and 8 are detail side elevations of the essential parts of my improved mechanism, representing the parts in different positions.

1 is part of the side frame of a printing-press of any suitable construction, and 2 is part of the form-cylinder of the press.

3 and 4 are the water form-rollers.

5 is a distributer-roller.

6 is the water-fountain, and 7 is the fountain-roller, mounted upon a shaft or axle 8, which is suitably journaled in the side frames of the machine.

10 is a rock-shaft journaled in the side frames of the machine and having keyed to it the bracket rock-arms 11, in the forked upper ends of which is journaled a ductor-roller 12, which is intermittently vibrated between the water-fountain roller 7 and the distributer-roller 5 for the purpose of conveying water from the fountain-roller to the distributer-roller.

The mechanism thus far described is quite common in the printing-press art and will be understood without further explanation.

In the press to which I have applied my improved variable cam mechanism the fountain-roller 7 is driven from the end opposite to the one which is illustrated in my drawings. Keyed to the end of the shaft 8 of the water-fountain roller is a suitable cam 15, having a low portion 15$^a$ of about one-third of its circumference.

The rock-shaft 10, which carries and operates the ductor-roller 12, projects beyond the machine-frame 1 and supports upon its projecting end a two-part rock-arm 20 21, which parts are formed integrally with or rigidly connected through a sleeve or socket portion 22, which is rigidly keyed to the rock-shaft 10. The part 20 of the rock-arm extends over adjacent to a suitable bracket 23, in which is mounted a limiting-screw 24, which is adapted to engage the arm 20 and limit its downward movement.

25 is an antifriction-roller journaled to the outer face of the rock-arm part 20 and supported in position to operate upon the periphery of the cam 15.

The part 21 of the two-part rock-arm projects rearwardly in front of the outer face of the cam 15—that is, upon the opposite side of the cam to the part 20 of the rock-arm. Mounted upon the end of the part 21 of the rock-arm is a bearing-stud 30, upon which is journaled an arm 31, carrying upon its inner face a freely-journaled antifriction-roller 32, supported in position to operate upon the periphery of the cam 15. The arm 31 has formed integral with its hub portion a segment-gear 33, with which meshes a worm 34, journaled in the bracket-bearing 35, formed integral with the part 21 of the double rock-arm. The worm 34 has keyed to the forward end of its shaft a hand-wheel 36, by means of which the worm 34 can be rotated for shifting the arm 31 upon its bearing on part 21 of the double rock-arm.

The arm 31 is held upon its bearing-stud by means of a collar 37, formed integral with a screw-pin 38, through which extends an operating-bar 39. The pin 38 is threaded into the stud 30, and the collar 37 confines the arm upon the stud.

Figure 5:
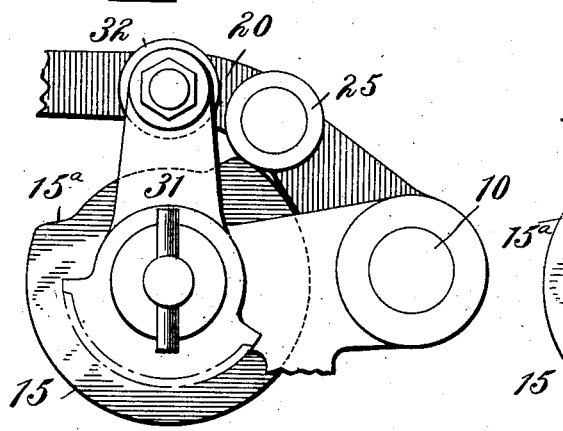
Figure 6:
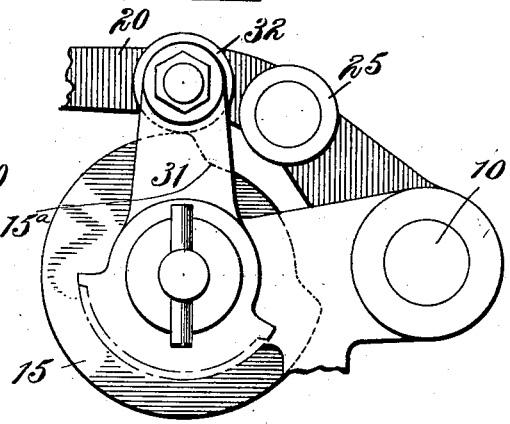
Figure 7:
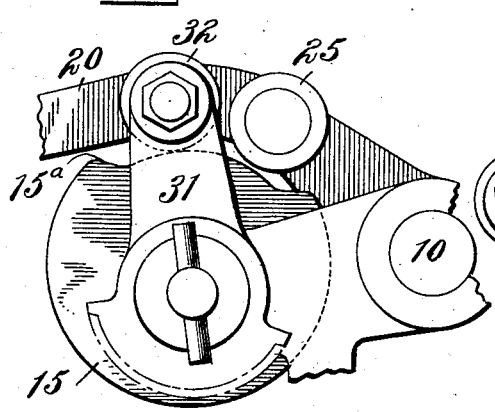

It will be observed that the antifriction-rollers 25 and 32 are supported in parallel longitudinal vertical planes and operate upon the inner and outer portions of the periphery of the cam 15, so that said rollers can be moved into position to bring their axes in line. If the adjustable arm 31 is shifted to bring the axis of antifriction-roller 32 in line with the axis of antifriction-roller 25, it will be observed that the mechanism will operate the same as an ordinary cam mechanism—that is, the rock-arm will be dropped when the rollers enter the low portion 15ª of the cam and will be allowed to remain in its lowered position until the whole length of the low portion of the cam passes the antifriction-rollers. If, however, the arm 31 is shifted into the position shown in Figs. 5, 6, and 7 of the drawings, it will be observed that the rock-arm cannot drop or move into lowered position until a sufficient part of the low portion of the cam has passed to accommodate both of the antifriction-rollers, as shown in Fig. 7, and the rock-arm will be immediately raised as soon as the high portion of the cam reaches one of the antifriction-rollers, as shown in Fig. 6. In Fig. 5 the mechanism is shown in the position assumed when one of the antifriction-rollers has been reached by the low portion of the cam, while the other one is still on the high portion of the cam and is just ready to enter the low portion of the cam to allow the rock-arm to drop. In Fig. 6 the cam-rollers are at the opposite end of the low portion of the cam, in which position the rock-arm has just been raised.

Figure 8:
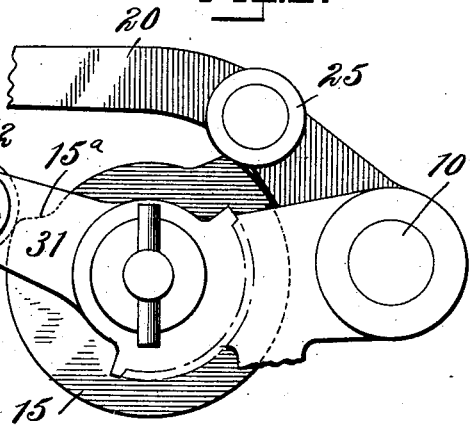

In Fig. 8 I have shown the arm 31 shifted to its extreme position, in which position there will be no movement whatever of the rock-arm, for the reason that the distance between the two antifriction-rollers is greater than the length of the low portion of the cam, whereas with the improved mechanism it is necessary for both antifriction-rollers to enter the low portion of the cam at the same time to allow the rock-arm to drop.

My improved variable cam mechanism is of especial importance in regulating the length of time that the ductor-roller remains in contact with the water-fountain roller for the purpose of determining the amount of water collected from the fountain-roller to be transferred to the distributer-roller. A simple mechanism which can be readily adjusted while the machine is operating is of great value for water form-motions of printing-presses, for the reason that it sometimes happens that while the press is running the operator notices from the work produced that he has supplied too much or not enough water to the plate to produce the desired result. It is also important in this connection to be able at times to shut off the supply of water entirely, in which case the arm 31 is adjusted to the position shown in Fig. 8 of the drawings. As has already been clearly explained, the arm 31 is readily adjusted while the mechanism is operating by simply turning the hand-wheel 36.

My improved variable cam mechanism is also applicable to other uses, and I do not limit myself to the specific application illustrated and described.

Having thus described my invention, the following is what I claim as new therein and desire to secure by Letters Patent:

1. The combination of a rock-arm, two relatively adjustable bearing members carried thereby and a cam on whose periphery the bearing members operate; permitting the movement of the arm by simultaneous dropping of the bearing members into the depression of the cam, at a period in the cam's rotation determined by the proximity of the bearing members to each other as explained.

2. The combination of a cam; a rock-arm carrying two bearing members acting on the periphery of the cam and arranged to both drop into the depression of the cam to permit the movement of the arm in one direction; and means for relatively adjusting the bearing members so as to vary the point in the cam's rotation which permits said bearing members to drop simultaneously into the depression of said cam.

3. The combination of a cam, a rock-shaft, a two-part rock-arm mounted upon said rock-shaft, antifriction-rollers journaled upon the two parts of said rock-arm, and means for relatively adjusting the antifriction-rollers, substantially as set forth.

4. The combination of a cam, a rock-shaft, a two-part rock-arm mounted upon the rock-shaft, an arm adjustably mounted upon one part of said rock-arm, means for adjusting said rock-arm with relation to the other part of said rock-shaft, and antifriction-rollers journaled upon said adjustable arm and the other part of said rock-arm, substantially as set forth.

5. The combination of a cam, a rock-shaft, a two-part rock-arm mounted upon said rock-shaft, an antifriction-roller journaled upon one part of said rock-arm, an arm adjustably mounted upon the other part of said rock-arm, an antifriction-roller journaled upon said adjustable arm, a segment-gear upon said adjustable arm, and a worm engaging said segment-gear for adjusting said arm with relation to the other part of the rock-arm, substantially as set forth.

6. In a printing-press, the combination of a fountain-roller, a distributer-roller, a rock-shaft having bracket rock-arms, a ductor-roller journaled in said bracket rock-arms and adapted to be vibrated between the fountain-roller and distributer-roller, a two-part rock-arm also mounted upon said rock-shaft, a cam supported in operative relation with the two parts of said rock-arm, and means for relatively adjusting the two parts of said rock-arm, substantially as set forth.

THOMAS M. NORTH.

Witnesses:
WM. E. KNIGHT,
J. GREEN.